May 17, 1938.    D. PALONI    2,117,447
MEAT LIFTER
Filed June 16, 1937
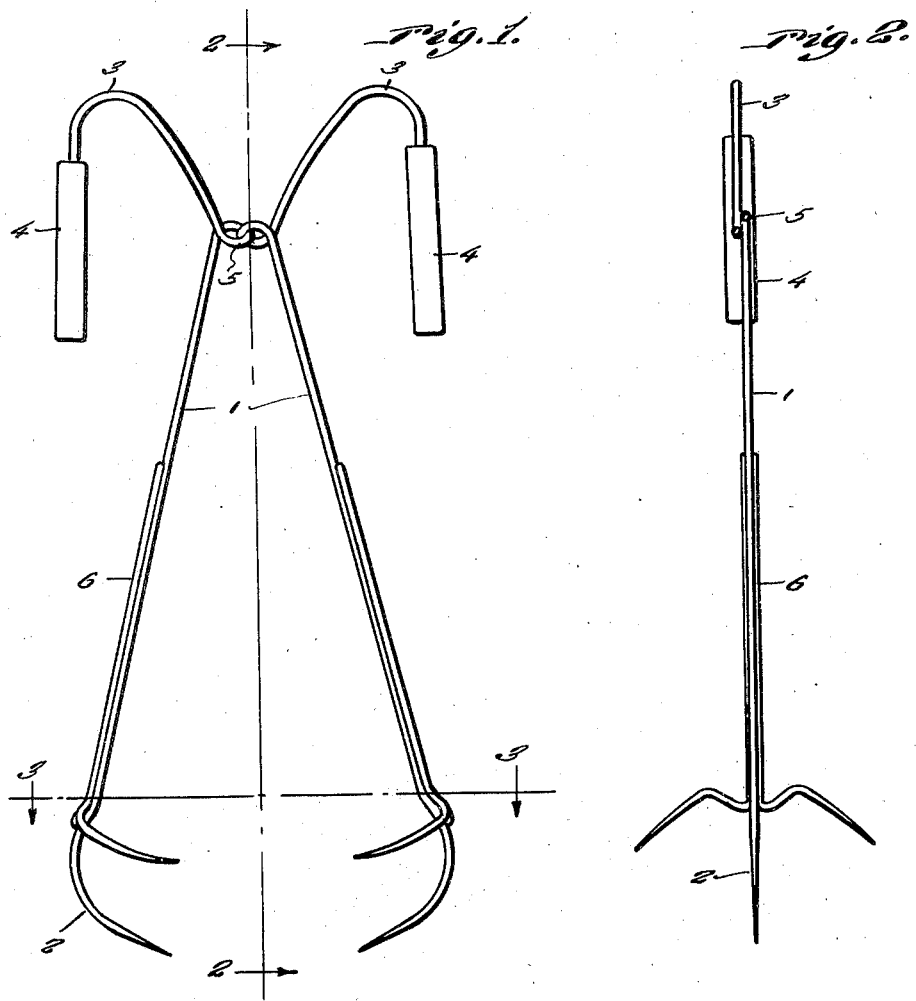
Inventor
Dominic Paloni
By Clarence A. O'Brien
Hyman Berman
Attorneys Patented May 17, 1938

2,117,447

UNITED STATES PATENT OFFICE 2,117,447

MEAT LIFTER

Dominic Paloni, Columbia, Utah

Application June 16, 1937, Serial No. 148,580

1 Claim. (Cl. 294—106)

This invention relates to a device for lifting meat and the like, the general object of the invention being to provide a pair of multiple shank units having prongs at their lower ends and their upper ends bent and provided with handles, with interengaging loops or eyes in the shanks for hingedly connecting the shanks together and permitting the device to be folded so that it will occupy but little space when not in use.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is an elevation of the device.

Figure 2 is a section on line 2—2 of Figure 1.

Figure 3 is a section on line 3—3 of Figure 1.

In this drawing, the numeral 1 indicates a pair of shanks, each having prongs 2 at its lower end, the prongs curving inwardly, as shown, and the upper end of each shank is bent into substantially inverted U-shape, as shown at 3, and a handle 4 is placed on the downwardly extending leg of each part 3. An eye or loop 5 is formed in each shank, preferably at the junction of the part 3 with the straight part of the shank and the eyes or loops of the two shanks engage each other. The eyes or loops extend inwardly and are so arranged that the shanks will pivot thereon, so that the prongs can be opened and closed or moved toward and away from each other, and said eyes or loops also permit one shank and its handle part to be folded alongside the other shank and its handle part.

Thus it will be seen that I eliminate the use of bolts, pins or hinges for connecting the two parts of the device together, so that there is nothing to become loose or lost and the loops not only form a pivot connection, but also a foldable one.

The drawing shows each shank as having its lower end forming one of the prongs 2 and the other two prongs are formed from a wire 6 looped upon itself, with its limbs contacting and secured to a portion of the shank, the ends of the wires being curved in opposite directions to form a pair of prongs, one at each side of the center prong, which is formed by the end of the shank 1.

By way of summation it will be observed that the meat lifter hereinbefore described and specifically disclosed in the drawing is characterized simply by a pair of duplicate companion wire units denoted by the numerals 1. The major portion of each unit is formed from a single length of wire and this is bent upon itself at predetermined points between the opposite ends of said length of wire to utilize the bend in the formation of the aforesaid loop or eye 5. The portions of the length of metal on opposite sides of this eye thus function as distinguishable shank members, the main shank being longitudinally elongated to terminate in the grappling hooks 2, the other shank member 3 being relatively short, but both shank members being in the same plane with each other. Then too, it is important to observe that the last-named short shank 3 assumes a position which is at substantial obtuse angles with the long shank and it terminates in a return bend to which the wooden handle or grip 4 is attached. By using these duplicate units it thus becomes possible to hingedly adjoin the respective eyes 5 to dispose the units in opposed companionate relationship allowing the jaws to be forcibly pressed together. It follows that applicant's device is somewhat related to a pair of ice-tongs wherein the handles 4 may be moved toward and from each other to positively regulate the opening and closing movement of the grappling jaws or prongs 2.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A meat lifter of the class described comprising a pair of duplicate companion wire units, the major portion of each wire unit being formed from a single length of wire bent upon itself at points between the ends of the wire to provide an assembling and hinging eye, the portions on opposite sides of the eye constituting distinguishable shank members, one shank member being longitudinally elongated and terminating in a plurality of meat grappling hooks, the other shank member being relatively short, disposed in a plane with the first named shank member and being bent at a substantial obtuse angle and terminating in a lateral return bend also disposed in the same plane as said shanks and extending to points on opposite sides of the axial center of said eye, and a hand grip carried by the return bend, the eyes of the respective units being hingedly connected together whereby to dispose the longitudinal shanks in opposed companionate relationship, and the short shanks in opposed diverging relationship with the hand grips in substantial spaced parallelism.

DOMINIC PALONI.